(12) United States Patent
Santin et al.

(10) Patent No.: US 11,964,779 B2
(45) Date of Patent: Apr. 23, 2024

(54) DEVICE AND METHOD FOR FILLING AN OIL RESERVOIR OF AN AIRCRAFT ENGINE

(71) Applicant: SAFRAN AIRCRAFT ENGINES, Paris (FR)

(72) Inventors: Mathieu Jean Jacques Santin, Moissy-Cramayel (FR); Clément Dupays, Moissy-Cramayel (FR); Bellal Waissi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 80 days.

(21) Appl. No.: 17/600,411

(22) PCT Filed: Mar. 13, 2020

(86) PCT No.: PCT/FR2020/050532
§ 371 (c)(1),
(2) Date: Sep. 30, 2021

(87) PCT Pub. No.: WO2020/201651
PCT Pub. Date: Oct. 8, 2020

(65) Prior Publication Data
US 2022/0212816 A1    Jul. 7, 2022

(30) Foreign Application Priority Data
Apr. 3, 2019    (FR) .................... 19 03583

(51) Int. Cl.
*G05D 9/02*    (2006.01)
*B64F 5/40*    (2017.01)
(Continued)

(52) U.S. Cl.
CPC ............... *B64F 5/40* (2017.01); *F01M 11/04* (2013.01); *F01M 11/12* (2013.01); *G05D 9/02* (2013.01); *G05D 9/12* (2013.01)

(58) Field of Classification Search
CPC ............... F01M 11/04; F01M 11/0458; F01M 11/0466; F01M 11/12; F16K 11/065;
(Continued)

(56) References Cited

U.S. PATENT DOCUMENTS 4,024,887 A    5/1977  McGregor
5,261,440 A *  11/1993 Frank ..................... B64D 11/02
                                                   137/208
(Continued)

FOREIGN PATENT DOCUMENTS

FR    899 615    6/1945
FR    2719922 A1 * 11/1995 ......... A47L 15/4244
(Continued)

OTHER PUBLICATIONS

International Search Report dated Aug. 18, 2020 in PCT/FR2020/050532 filed on Mar. 13, 2020, 3 pages.
(Continued)

*Primary Examiner* — Hailey K. Do
(74) *Attorney, Agent, or Firm* — Oblon, McClelland, Maier & Neustadt, L.L.P.

(57) ABSTRACT

In order to fill a reservoir while avoiding laborious manual filling operations, there is added to the existing device, including a supply duct, a pump and a measuring probe, a stop valve designed to interrupt the filling as soon as the desired level has been reached, which is detected for example by an air intake which controls the closure of the valve. Two level indicators are added and make it possible to ascertain either that optimum filling has been achieved or that a malfunction is present in the system. Application to the systems for oil filling of aircraft engine reservoirs from another reservoir arranged within the aircraft, generally common to all the engines.

20 Claims, 7 Drawing Sheets

(51) Int. Cl.
  *F01M 11/04* (2006.01)
  *F01M 11/12* (2006.01)
  *G05D 9/12* (2006.01)
(58) Field of Classification Search
  CPC ............ F16K 11/0746; F16K 31/122; F16K 31/1221; F16K 31/1223; F16K 31/1226; G05D 9/12
  See application file for complete search history.

(56) References Cited

U.S. PATENT DOCUMENTS

| | | | |
|---|---|---|---|
| 6,095,178 A * | 8/2000 | Gilbert | G05D 9/12 |
| | | | 73/304 R |
| 10,746,284 B2 * | 8/2020 | Gmirya | F16H 57/0435 |
| 11,639,771 B2 * | 5/2023 | Molla | F16N 31/00 |
| | | | 184/7.4 |
| 2007/0209880 A1 | 9/2007 | Rollins et al. | |
| 2010/0230003 A1 | 9/2010 | Rollins et al. | |
| 2014/0007675 A1 | 1/2014 | Mehrer et al. | |

FOREIGN PATENT DOCUMENTS

| | | |
|---|---|---|
| FR | 3 020 093 A1 | 10/2015 |
| WO | WO 2019/122658 A1 | 6/2019 |

OTHER PUBLICATIONS

Preliminary French Search Report dated Dec. 9, 2019 in French Patent Application No. 19 03583 filed on Apr. 3, 2019 (with translation of category of cited documents), 2 pages.

* cited by examiner

DEVICE AND METHOD FOR FILLING AN OIL RESERVOIR OF AN AIRCRAFT ENGINE

BACKGROUND OF THE INVENTION

Field of the Invention

The present invention relates to a device and a method for filling an oil tank of an aircraft engine.

Description of the Related Art

Some aeroplanes have a device for remotely supplying oil to tanks adjacent to the engines and for lubricating them. The oil usually originates from a second tank located elsewhere in the aeroplane and usually common to all engines. The advantage of this arrangement is that it avoids the need to manually fill the engine tanks, which are not easily accessible. The filling devices comprise a supply duct connecting the second tank or aeroplane tank to the engine tanks, a pump placed on the duct, and means for controlling the operation of the pump in an automatic or non-automatic mode. The control may be continuous or expressed as an integer number of pulses, at each of which a given dose of oil is delivered to the tank.

The tanks should be filled to as accurate a level as possible, corresponding to an optimum filling, as underfilling results in a decrease in the possible running time of the engine and overfilling is prohibited by regulation, as it leads to a restriction of the upper free volume, intended for venting of the tank and for expansion of the oil.

It is common practice in this technical field to use oil level probes in the tank to be filled in order to assess not only a filling height, but also a volume of oil to be supplied during filling, on the basis of the height of oil when filling is decided. Such probes are designed to measure the oil level at any height and at any time in the tanks containing them. Document WO 2019/122658 A1 describes such an oil level probe. These advantages, compared to simpler devices used in the prior art to control filling and possibly avoid overfilling, can be explained in comparison to other documents. US 2014/007675 A1 describes a filling device whose measurements are made by two probes penetrating the tank and each fitted with an electrical resistor capable of indicating whether or not they are immersed in the oil, based on the heating they undergo when an electrical current flows therethrough. With such a device, the lower resistor is placed at the underfill level, and the upper resistor at the overfill level. Filling is initiated at the latest when the oil level reaches the lower resistor, and continued until it rises to the upper resistor. As this device does not indicate the amount of oil to be supplied at each filling, filling has to be slow enough not to exceed the level of the upper resistor due to system inertia. And above all, sensors based on resistors are subject to various types of damage and breakdowns, which will also be found in the probes typically used for the invention.

Reference may also be made to Document U.S. Pat. No. 4,024,887 A which describes an oil supply cut-off device which closes a shut-off valve in the oil supply duct leading to the tank, as soon as the oil in the tank has reached the cut-off device. A certain slowness in filling can also be recommended here to avoid quickly reaching and exceeding the upper threshold of the oil level.

However, the oil level probes used mainly in the invention, which are generally comprised of electrical switches arranged in tiers at different heights of the tank and a magnetic float on the free surface of the oil, capable of closing some of these switches, are subject to fairly significant inaccuracies, as well as to damages which may be due to ageing produced by thermal or mechanical cycles, vibrations, fatigue or chemical alteration, and some effects of which may be damages to electrical connections, the appearance of additional resistances, or locking or short-circuiting of some of the switches, or even locking of the magnetic float. In practice, therefore, in order to avoid prohibited overfilling, underfilling based on the measurement uncertainties ascribed to the probe has to be accepted, but which may reach relatively large values in practice, of half a litre for example, corresponding to several hours of engine autonomy.

BRIEF SUMMARY OF THE INVENTION

The object of the invention is to dispense with these measurement uncertainties of the probe and their consequences on the quality of tank filling, by means of an improved device, which in principle ensures filling to an optimum level, and without the risk of exceeding it despite the uncertainties inherent in level probes.

In a general form, the invention thus relates to a device for filling an aircraft engine oil tank, comprising a supply duct leading to the tank, a pump placed on the supply duct, a filling processing module, connected to a probe of an oil level in the tank and giving height indications of said oil level, characterised in that the supply duct comprises a filling shut-off valve located between the pump and the tank, a device for closing the shut-off valve, independent of the probe and of the processing module, sensitive to the oil rising to an optimum fill level of the tank, and the processing module comprises a tank overfill indicator and a tank nominal fill indicator, said indicators being controlled when the oil reaches an overfill level above the optimum fill level and a nominal fill level below the optimum fill level, respectively, and the optimum fill level is distant from the nominal fill level and the overfill level by differences in height both corresponding to a measurement uncertainty ascribed to the probe.

Uncertainties referred to here are uncertainties deemed to be inherent in the probe and actually correspond to tolerances. The actual measurement uncertainty of the probe may be greater if there is a drift in its operation, and the invention will still be useful in detecting such malfunctions.

The shut-off valve is designed to interrupt oil supply as soon as the optimum fill level is reached. Both indicators, in combination with the valve, make it possible to check immediately that the optimum level has actually been reached, without being exceeded or by being slightly exceeded, without reaching overfilling, at the end of filling. This eliminates the need for a time-consuming visual check of the oil level in the poorly accessible engine tank. As a result the collaboration of the probe and the shut-off valve in accordance with the invention for filling makes it possible to notice a malfunction of one or the other if an abnormal result is given by both indicators, whatever the nature of the malfunction (valve breakdown or incorrect probe measurements).

It may also be pointed out that the invention relies on the combination of an oil level probe, a cut-off device and fill indicators to ensure either optimum filling if the system is operating correctly, or reliable detection of a system fault if it is not. The level probe considered in the invention indicates the oil level remaining in the tank at any time and thus makes it possible to deduce a fill volume to be supplied, while accepting a significant uncertainty. The cut-off device ensures filling up to the optimum level and can therefore correct the uncertainty inherent in the probe, except in the event of damage or breakdown of this device, which it is however impossible to detect directly; but a judicious adjustment of the volume of oil to be supplied makes it possible to compensate for these shortcomings, by means of the indications from the indicators.

According to some preferred and optional embodiments of the invention:

the processing module comprises a display for the amount of oil to be supplied to the tank, based on measurements of the probe; the supply can then be triggered manually by an operator, all the more easily if it is converted into a number of filling pulses, each delivering a known amount of oil;

the supply duct comprises a bypass around the pump, equipped with a flap valve allowing only a reverse flow to a supply circulation produced by the pump towards the tank; if the supply is continued after the shut-off valve is closed, it then becomes a simple recirculation of oil around the pump, passing through the bypass and returning upstream of the pump, which makes it possible to continue without fear pumping of oil for the entire duration initially envisaged, even if this duration has been overestimated.

Other preferred and optional embodiments relate to the shut-off valve and its means of collaboration with the rest of the device:

the device of the shut-off valve comprises an air duct connecting to the tank through an oil-sealable outlet port and, at an opposite end, connecting to an inlet with a pressure lower than a pressure in the tank, the air duct passing through a first control chamber of the shut-off valve, and the shut-off valve contains a shutter of the supply duct, moved by a pressure in the first control chamber between an opening position of the supply duct when the pressure in the first control chamber is exposed to the pressure in the tank and a closing position of the supply duct when the pressure in the first control chamber is exposed to said lower pressure;

said opposite end of the air duct connects to a venturi portion of the supply duct located between the pump and the shut-off valve;

the air duct also passes through the shutter of the shut-off valve, and is cut off by the shutter when the latter is in the closing position;

the shut-off valve comprises a spring returning the shutter to the opening position;

the shut-off valve comprises a second control chamber, opposite to said first control chamber with respect to the shutter, and connected to the supply duct between the pump and the shut-off valve by a pressure inlet duct.

These additional means all allow for the construction of a simple, yet reliably operating shut-off valve.

Another aspect of the invention is a method for filling an oil tank equipped with a filling device according to the foregoing, consisting in determining an amount of oil to be delivered to the tank based on an initial oil level measurement given by the probe, delivering said amount, characterised in that it comprises checking filling and the device, made based on the indicators.

The advantage of the invention is more apparent if said checking is made exclusively based on visual check means belonging to the device and comprising said indicators, since the ability to dispense with visual checking of the filling is obtained with a particularly simple device.

Advantageously, the amount of oil actually delivered corresponds to an amount evaluated to reach with certainty the optimum fill level, and comprising an amount theoretically necessary to reach said optimum fill level from the initial oil level measurement, increased by a fixed amount being a function of a measurement uncertainty ascribed to the pump and corresponding to a difference in level equal to twice the uncertainty of the probe; and even more advantageously, the amount of oil to be delivered corresponds to an amount evaluated to reach with certainty the overfill level in the event of damage to the device for closing the valve and corresponding to a difference in level equal to four times the uncertainty of the probe.

The method further advantageously comprises automatically shutting off the pump when either the shut-off valve is detected as closed or the overfill level is reached.

Finally, another aspect of the invention is an aircraft comprising at least one device according to the foregoing, wherein the oil tank is an engine tank, and the supply duct originates from another oil tank present in a cabin of the aircraft, according to the application mainly contemplated for the invention.

To recapitulate some possible aspects of the invention:

the aeroplane tank is disposed in the aircraft at a distance from the engine;

the shutter is moved to the closing position of the supply duct when the pressure in the first control chamber is exposed only to the pressure, lower than the pressure in the tank, at the end of the air duct opposite to the tank;

the device comprises a module for automatically controlling the pump based on indications from the processing module; a sensor detecting closures of the shut-off valve and an indicator of said closures detected by the sensor; a sensor processing module, informed by the sensor to shut off the pump when closures of the shut-off valve have been detected;

the amount of oil to be delivered corresponds to an amount evaluated to reach with certainty the optimum fill level, and comprising an amount theoretically necessary to reach said optimum fill level from the initial oil level measurement, increased by a fixed amount being a function of a measurement uncertainty ascribed to the pump.

BRIEF DESCRIPTION OF THE SEVERAL VIEWS OF THE DRAWINGS

These and other aspects, characteristics and advantages of the invention will now appear more clearly from detailed comments on the following figures, relating to some preferred and purely illustrative embodiments of the invention, and therefore not exclusive of other embodiments.

DETAILED DESCRIPTION OF THE INVENTION

Figure 1:
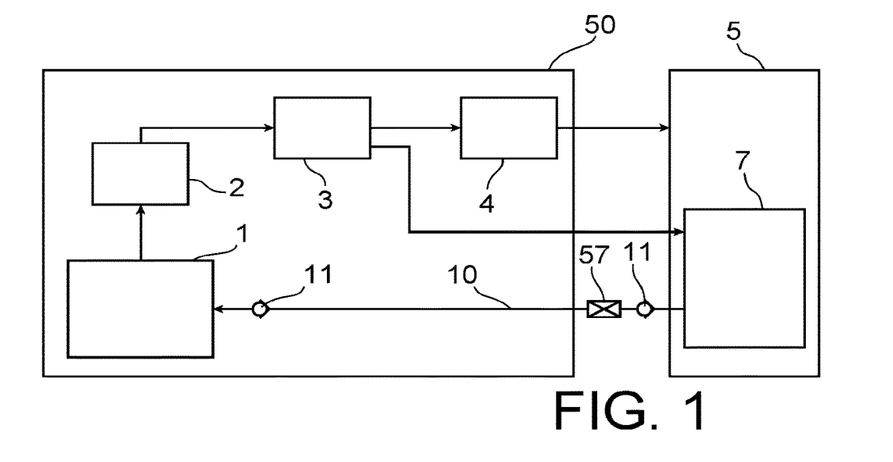
FIG. 1 represents a known device for filling an oil tank for an aeroplane engine.
Figures 2, 3, 4:
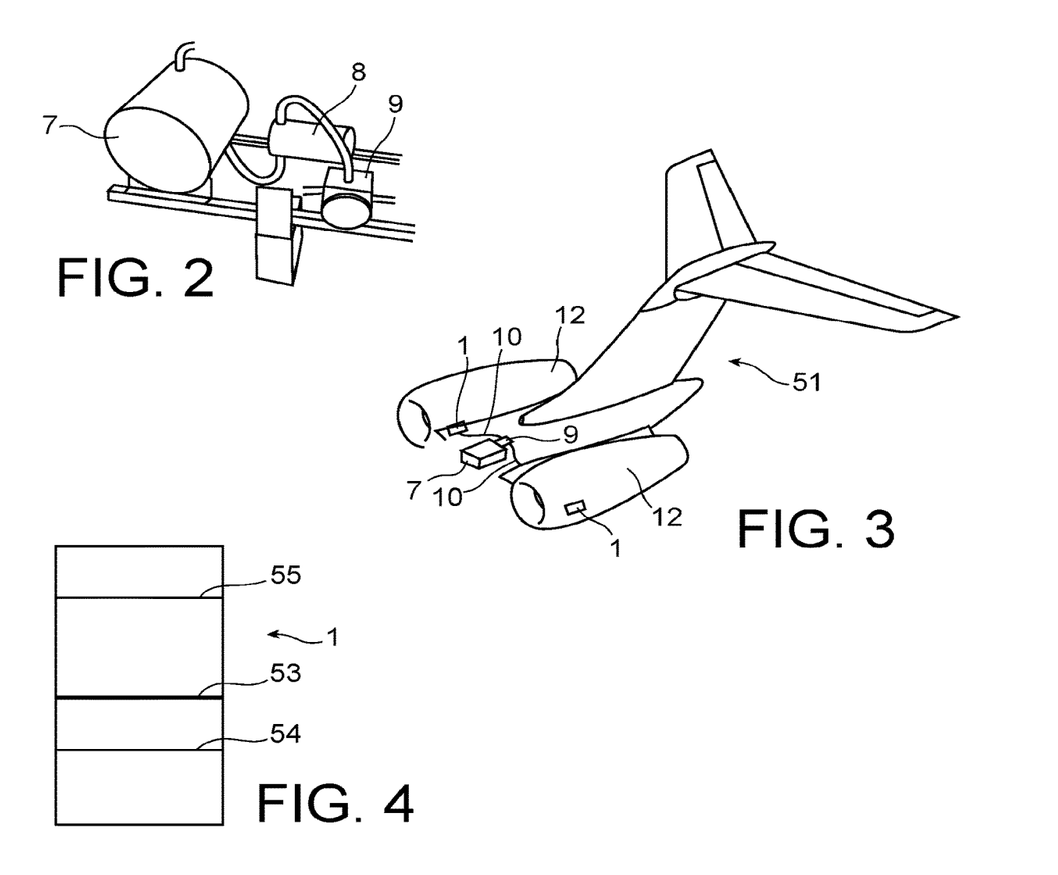
FIG. 2 illustrates the central tank for supplying the engine tank.
FIG. 3 represents a complete device where the central tank serves several engine tanks.
FIG. 4 schematically represents filling of an engine tank.

FIG. 1 schematically illustrates a known device. An engine tank 1 is provided with an oil level probe 2, which communicates its measurements to an acquisition unit 3. When the latter deems the oil level to be insufficient, it sends a signal to a correction request unit 4 which utilises a supply system 5. The supply system 5 comprises an aeroplane tank 7 (FIG. 2) provided with an electric pump 8 and, downstream of it, a switching valve 9 through which the aeroplane tank 7 can supply oil to the engine tank 1 by opening a supply duct 10 connecting them, this supply duct 10 being provided with non-return valves 11 across the tanks 1 and 7. As shown in FIG. 3, an engine tank 1 is present on each of the engines 12 of an aeroplane 51 only partially represented and served by a particular supply duct 10, and the switching valve 9 allows the selection in turn of which of the supply ducts 10 to open and which of the engine tanks 1 to supply. The supply system 5 common to the different engines 12 and engine tanks 1 is located in the cabin of the aeroplane 51. The aeroplane tank 7 is usually provided with a visual oil level gauge. Filling of the tank is checked during successive inter-flight maintenance. When filling is carried out and the probe 2 indicates a sufficient level, the acquisition unit 3 indicates this to the supply system 5, which interrupts operation of the pump 8. Alternatively, the control operations can be carried out by an operator. The engine tank 1, the probe 2, the acquisition unit 3 and the correction control unit 4 may be away from each other in the aeroplane 51, although the acquisition unit 3 and the correction control unit 4 may either be disposed on the engine and then form a unit equipment assembly 50, or may be located in the aeroplane fuselage, or may be united in a single calculator. Communications may be made in a wired, analogue or digital manner, for example using an ARINC-type data bus.

FIG. 4 illustrates the need to maintain an oil level 53 between a lower limit 54 and an upper limit 55 inside each engine tank 1, in order to avoid both lubrication lack in the engine 12 and overfilling; the top of the tank 1 is an oil venting and expansion volume which has to remain free. Drifts of the probe 2, which would result in either over- or underestimating the amount of oil and the height of the level 53, therefore have to be avoided. The aim of filling is to bring the oil level 53 back to the upper limit 55 by a method that can be manual or automated.

Let us turn now to comments on some embodiments of the invention.

Figure 5:
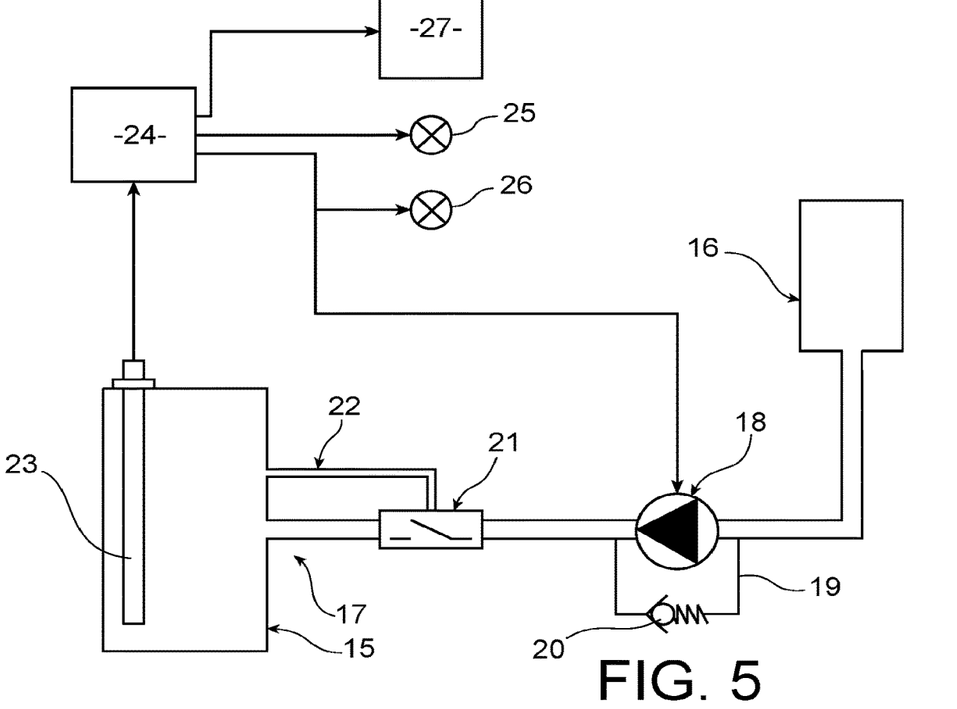
FIG. 5 illustrates one embodiment of the invention.

The device represented in FIG. 5 comprises an engine tank 15, an aeroplane tank 16, a supply duct 17 uniting the tanks 15 and 16, a pump 18 placed on the supply duct 17 and arranged so as to be able to force an oil flow from the aeroplane tank 16 to the engine tank 15, a bypass 19 of the supply duct 17 bypassing the pump 18 and allowing recirculations exclusively towards the aeroplane tank 16 around the pump 18, by means of a non-return valve 20 which is placed thereon. The device further comprises: a shut-off valve 21 located on the supply duct 17 between the pump 18 and the bypass 19 on the one hand, and the engine tank 15 on the other hand; an air duct 22 connecting to the engine tank 15 above the level at which the supply duct 17 connects, and passing through the shut-off valve 21 to control it, as will be seen later; a probe 23 inside the engine tank 15, for measuring the oil level therein, and which may be of the kind comprising a magnetic float, as is described at the beginning of this description; a processing electronics 24 capable of interpreting indications from the probe 23, indicating a volume of oil to be delivered for filling, and possibly cutting off the operation of the pump 18, and in which the functions of the acquisition unit 3, of the correction request unit 4, and the supply system 5 described in the known embodiment are thus found in particular; a fill indicator 25 and an overfill indicator 26, turned on by the processing electronics 24 when a nominal fill threshold and an overfill threshold, both measured by the probe 23, are respectively reached; and a display 27 for the amount of oil to be delivered to the engine tank 15, also informed by the processing electronics 24 based on the indications of the probe 23. The processing electronics 24, indicators 25 and 26, and display 27 make up a processing module.

Figure 6:
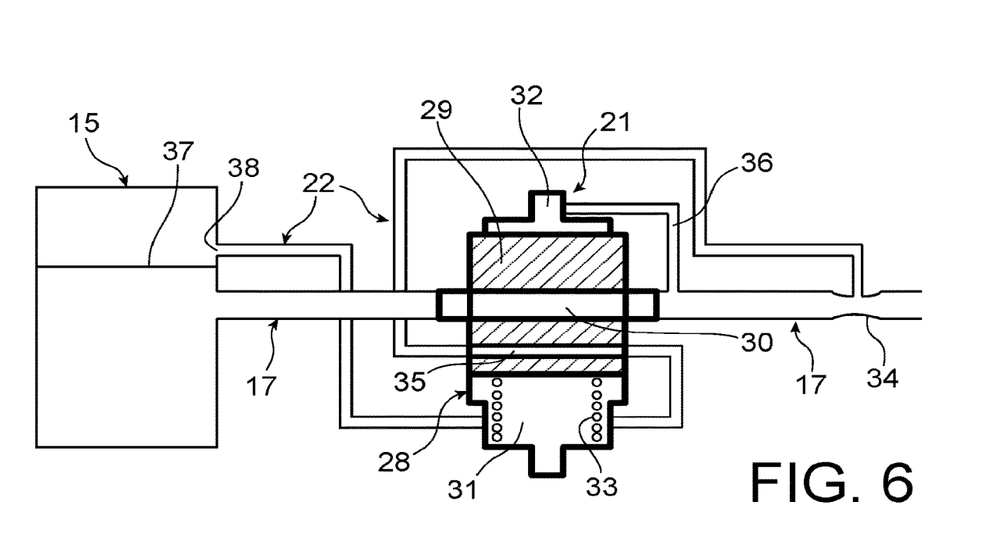
FIG. 6 illustrates the shut-off valve in an open state.

FIG. 6 illustrates the shut-off valve 21 in more detail. It includes a cylindrical sleeve 28 in which a spool 29, through which a portion 30 of the supply duct 17 passes, slides and which is capable of moving it. The portion 30 is in continuity with the rest of the supply duct 17, which is therefore free, in the state shown in FIG. 6. The ends of the sleeve 28 are occupied by a first control chamber 31 and a second control chamber 32 respectively, facing the opposite ends of the spool 29 to move it by fluid pressure in either direction. A spring 33 is disposed in the first control chamber 31 and tends to push the spool 29 back into the position shown in FIG. 6, where the supply duct 17 is open. The air duct 22 passes through the shut-off valve 21 twice, first by passing through the control chamber 31 and then through the spool 29. Its end opposite to the engine tank 15 opens into the supply duct 17 at a venturi 34 thereof, between the shut-off valve 21 and the pump 18. The air duct 22 is open in the state shown in FIG. 6. A portion 35 of the air duct 22 is formed by a channel passing through the spool 29, and is in continuity with the rest of the air duct when the air duct is in the open state, that is when the shut-off valve 21 is open. And a pressure inlet duct 36 connects the second control chamber 32 to the supply duct 17 between the shut-off valve 21 and the pump 18.

Figure 7:
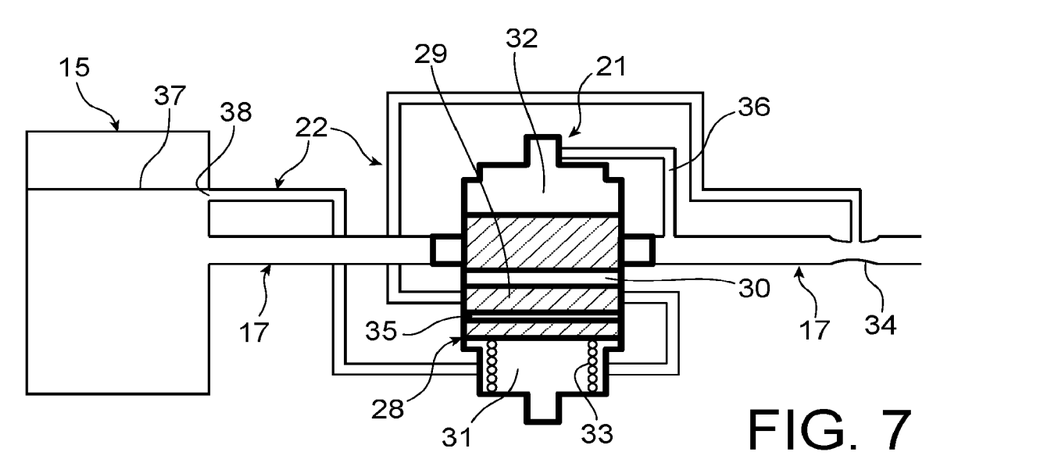
FIG. 7 illustrates the shut-off valve in a closed state.

FIG. 7 illustrates the other state of the shut-off valve 21: the spool 19 is moved by restricting the first control chamber 31 and overcoming the action of the spring 33, so that the portions 30 and 35 of the supply duct 17 and the air duct 22 that pass through the spool 29 are moved and are no longer in continuity with the rest, thereby sealing these ducts 17 and 22. This state is reached when the oil level 37 in the engine tank 15 reaches or exceeds the outlet 38 of the air duct 22 in the engine tank 15, and thus seals this duct, for the reason that will be detailed later. If the pump 18 is then working, the pumped oil is subject to recirculation through the bypass 19, with the non-return valve 20 opening. When the shut-off valve 21 is open and the pump 18 is operating, no recirculation occurs, as the non-return valve 20 is set to a force sufficient to keep the shut-off valve 21 in this closed state despite the pressure difference thereby prevailing between both sides of the pump 18: all the pumped oil reaches the engine tank 15.

Figure 8:
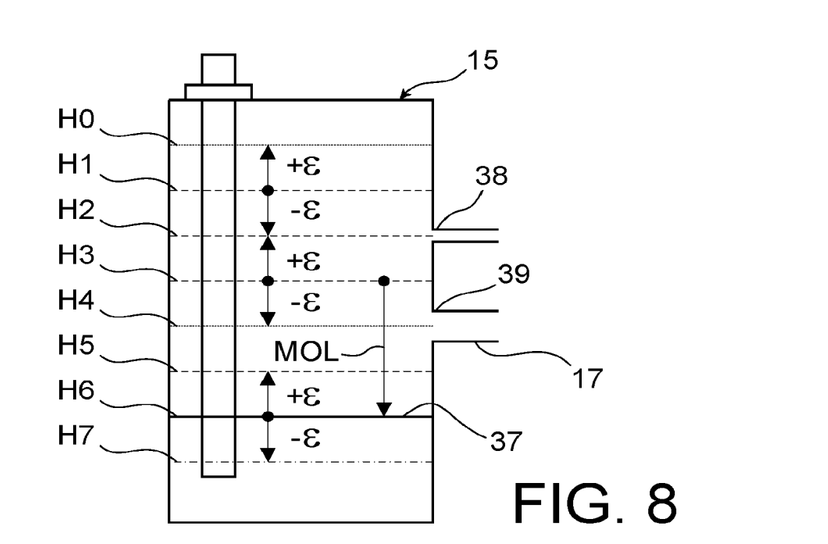
FIG. 8 is a diagram illustrating filling of an aeroplane tank.

Turning now to the comments in FIG. 8. The engine tank 15 should be filled to a level $H_2$ which corresponds to an optimum filling. The amount of oil to be delivered is traditionally decided based on a measurement of the level 37 by the probe 23, but its uncertainties explain why the known devices are improved here. The outlet 38 of the air duct 22 is at the optimum fill level $H_2$. As the shut-off valve 21 closes and interrupts oil supply by forcing recirculation around the pump 18 as soon as the oil reaches this level, the shut-off valve 21 in combination with the air duct 22 would therefore alone achieve an optimum filling of the engine tank 15. However, it can also be subject to failure and breakdown, so it has to be checked that it properly operates to make sure of the filling quality. The device makes use of a combination of the probe 23 with the shut-off valve 21 for this purpose, with a filling method that will be described. The indicators 25, 26 and, if applicable, the display 27, will indicate success or failure of the filling. The nominal fill indicator 25 and the overfill indicator 26 respectively turn on when a nominal fill level $H_3$ and an overfill level $H_1$ reached by the oil (with its uncertainties) are measured by the probe 23.

It is recommended that the nominal fill level $H_3$ and the overfill level $H_1$ are respectively at a lower and higher altitude than the optimum fill level $H_2$ by an amount $\varepsilon$ ($H_3=H_2-\varepsilon$, and $H_1=H_2+\varepsilon$), where $\varepsilon$ is an absolute value of a measurement uncertainty ascribed to the probe 23, as has been mentioned. The measurement uncertainty $\pm\varepsilon$ or $-\varepsilon$ considered here is an uncertainty deemed normal; the actual uncertainty of the probe 23 may be greater in practice, and this will be discussed below to indicate that the invention allows for its detection.

The outlet 39 of the supply duct 17 into the engine tank 15 is here at a level $H_4=H_2-2\varepsilon$, without the need for it.

When filling is decided, a measurement of the oil level 37, at a level $H_6$ at that instant, is made by the probe 23. The amount of oil necessary to fill the engine tank 15 to the optimum fill level $H_2$ cannot be accurately evaluated, however, because of the measurement uncertainty $\pm\varepsilon$ ascribed to the probe 23, which means that the actual oil level to give the measurement at $H_6$ may be between the levels $H_5=H_6+\varepsilon$ and $H_7=H_6-\varepsilon$. In order to reach with certainty the optimum fill level $H_2$, it will therefore be necessary to inject into the engine tank 15 an amount of oil corresponding to a level rise equal to (MOL+$\varepsilon$+$\varepsilon$), where MOL ("Missing oil level") corresponds to the difference in level between $H_6$ and $H_3$, and the height of the volume of oil to be delivered to the engine tank 15 (assuming a perfect measurement of the probe 23) to reach the nominal fill level $H_3$ and force turning on of the filling indicator 25, and $\varepsilon$ corresponds first to an increase necessary to reach the optimum fill level $H_2$ (since $H_2-H_3=\varepsilon$), and then a further increase to take the measurement uncertainty of the probe 23 into account, if the actual oil level is at $H_7$ ($H_6-\varepsilon$). This causes the probe 23 to measure that the tank is filled above the maximum fill level $H_3$, even if the initial oil level is at $H_7$, filling it from $H_4$ when the amount corresponding to the difference in level MOL has been injected, then to $H_3$ when the amount corresponding to the difference in level (MOL+$\varepsilon$) has been injected, and finally to $H_2$ when the amount corresponding to the difference in level (MOL+$2\varepsilon$) has been added, will nevertheless prove defective in the event of a failure to close the shut-off valve 21, since, except in the extreme situation where the initial oil level is at $H_7$, that is at the lower limit possible based on the uncertainty $\pm\varepsilon$ assumed for the measurements of the probe 23, the oil level will rise above the optimum fill level $H_2$ and will result in an overfill which may not be detected. An improvement to the method is then to deliver an additional volume of oil to force an overfill sufficient to turn on the corresponding indicator 26, in case the shut-off valve 21 does not close. This additional volume of oil corresponds to a difference in level of $2\varepsilon$ to reach the level $H_o$, corresponding to the height $H_1+\varepsilon$ and the upper limit of the overfill detection level, again based on the measurement uncertainty $\pm\varepsilon$ of the probe 23, and also corresponding, in this embodiment, to ($H_2+2\varepsilon$). In this method embodiment particularly recommended for the invention, an amount of oil will therefore be injected which would correspond to a rise in the oil level of the difference in level equal to (MOL+$4\varepsilon$) in the aeroplane tank 15, if it were fully delivered by the device (which the shut-off valve 21 does not necessarily allow).

In the case of a pulse supply, the amount to be delivered may therefore be converted into the number of pulses to be given by an operator, which he/she will read on the display 27, and the processing electronics 24 will shut off the pump 18 at the end of each pulse, or as soon as the filling is completed. The start of each pulse will be triggered by the operator pressing a button, and the pulses will have a fixed duration. The amount of oil they will deliver is defined by mechanical and dimensional characteristics of the device, in particular by the flow rate of the pump 18. The number of pulses X to be given, indicated by the display 27, decreases as soon as one of them is over. This number may represent the increased amount, actually delivered according to the method (preferably (MOL+$4\varepsilon$) to diagnose a failure of the shut-off valve 21, as has been seen), or a nominal amount for filling (MOL for example), and the amount increase is then delivered automatically, by a time-out of determined duration, during which the operation of the pump 28 is prolonged before it is cut off.

The oil supply can also be controlled by the operator. Three modes are particularly contemplated:
manual by the operator making the right number of pulses on a button to inject an amount equivalent to MOL+$4\varepsilon$;
time-out with a duration T, type 1: the operator presses the button, which triggers the filling system and the time-out. When the oil level reaches $H_2$, valve 21 cuts off the oil intake. When the time-out T is over, it cuts off the filling system. The duration T has to be longer than the filling time by MOL+$4\varepsilon$;
time-out with a duration T, type 2: the operator presses the button, which triggers the filling system. When the oil level is detected at $H_3$ by probe 23, the time-out is initiated. The duration T is calculated to fill more than $4\varepsilon$. When the oil level reaches $H_2$, valve 21 cuts off the oil intake. When the time-out is over, pump 18 is cut off. In any case, display 27 will indicate the end of the filling method. Any failures can then be observed by means of the state of indicators 25 and 26.

Examining now the situation produced by some possible failures of the device.

Figure 9:
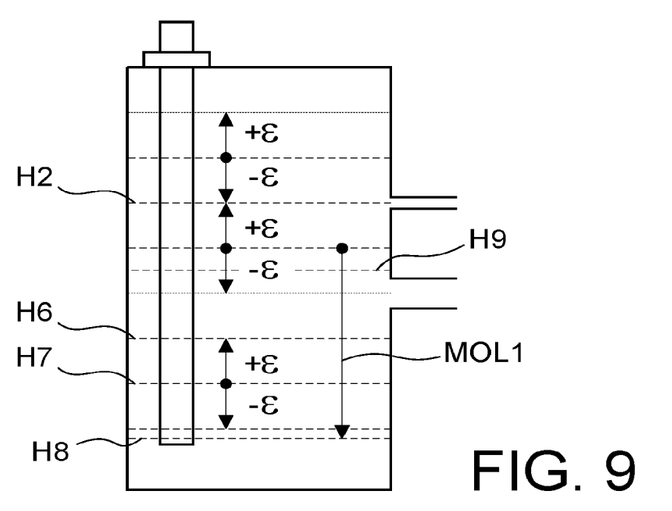
FIG. 9 is an analogous diagram illustrating a probe failure.

FIG. 9 illustrates a situation where probe 23 underestimates all actual oil levels by an amount that exceeds the allowed uncertainty $\pm\varepsilon$. The actual oil level at $H_6$ is then measured at level $H_8$ (below $H_7$), which leads to an overestimation of the volume to be delivered, that is (MOL 1+$4\varepsilon$) by applying the previous operating principle. MOL 1 is defined as MOL in FIG. 8, that is the difference in level between $H_2$ and $H_8$, or the height of the volume of oil to be delivered in order to achieve turning on of the nominal fill indicator 25 assuming perfect measurements from probe 23. When this volume is delivered, filling is performed at the optimum level $H_2$, but the probe 23 will indicate a measurement level $H_9$ ($H_2-H_9=H_6-H_8$) lower than the nominal fill level $H_3$, and none of the indicators 25 and 26 will be turned on, even when the display 27 indicates the end of the filling. The incorrect state of probe 23 will then be revealed.

Figure 10:
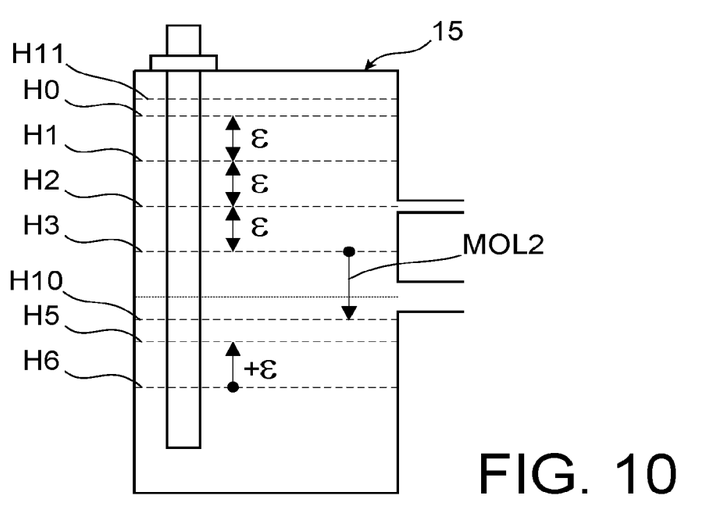
FIG. 10 is an analogous diagram illustrating another probe failure.

In the opposite case of overestimation of the oil levels in the engine tank 15 beyond the uncertainty ε, represented by FIG. 10, the measurement level will be $H_{10}$ for the actual level $H_6$, above the upper allowable measurement limit $H_5$, the nominal amount of oil to be delivered MOL 2=($H_3$–$H_{10}$) will be underestimated. However, by still providing the volume increase corresponding to 4ε height, the oil level will raise to the optimum fill level $H_2$ at the end of the process, but the overestimation of the measurement will result in a measurement level $H_{11}$ ($H_{11}$–$H_2$=$H_{10}$–$H_6$) above $H_0$ (which, it should be reminded, corresponds to the overfill threshold $H_1$ increased by the uncertainty±ε allowed by probe 23), which will cause indicator 26 to turn on like light 25, since the measured level will be higher than the overfill level $H_1$. This will result in a final state where both indicators 25 and 26 are turned on.

Finally, in the event of failure of the shut-off valve 21, the supply to the engine tank 15 will continue above the optimum fill level $H_2$ and above the overfill level $H_1$, at least until the level $H_0$=$H_1$+ε, which will likewise result in a final state where both indicators 25 and 26 will be turned on as long as the measurements by the probe 23 remain within the accepted tolerance±ε.

To summarise, a satisfactory state of the device will be given by a final state where the fill indicator 25 and only it will be turned on, the overfill indicator 26 remains turned off. The other final states will indicate a failure or breakdown of a device component and will require examination thereof. If the final state includes both indicators 25 and 26 turned on, an examination of the visual gauge of the engine tank 15 will determine whether the actual level is at the optimum fill level $H_2$, which will mean an overestimation of the measurements, or whether it is higher than the overfill level $H_1$, which will mean a failure of the shut-off valve 21. In the latter case, departure of the aeroplane will be allowed only after manual adjustment of the oil level. In the case of a failure of probe 23 due to over- or under-estimation of the measurements, the optimum fill level $H_2$ being still reached but not exceeded, departure of the aeroplane will be possible despite the erroneous indications of probe 23, but taking account of its excessive uncertainty during the flight.

The operation of the shut-off valve 21 will be briefly described. It is open, with the spool 29 in the position of FIG. 6, when the device is at rest, and then at least during the beginning of filling, as long as the oil level 37 has not reached the optimum fill level $H_2$. The first control chamber 31 is approximately at the pressure of the engine tank 15, and the spring 33 keeps this state. The pressure in the first control chamber 31 slightly drops when the pump 18 is active since a vacuum is produced in the venturi 34 and causes a slight air suction, but without therefore changing the general state of the device, the spool 29 undergoing a small movement which does not close either the supply duct 17 or the air inlet duct 22.

But, when the oil level reaches the optimum fill level $H_2$, and the oil seals the outlet 38 of the air duct 22, the pressure in the air duct 22 suddenly becomes close to the pressure in the venturi 34, so that the pressure in the second control chamber 32 becomes significantly higher than that in the first chamber 31, the spool 29 moves by compressing the spring 33, and the portions 30 and 35 of the supply duct 17 and the air duct 22 which pass through it and are moved, and the supply duct 17 and the air duct 22 are closed. The oil that is still being pumped no longer reaches the engine tank 15. The pressure in the now isolated first control chamber 31 remains at a lower value, insufficient to reverse this closing state of FIG. 7. When, however, the pump 18 is cut off, the pressure in the second control chamber 32 decreases, some of its contents flows out of it through the duct 36 and the spool 29 returns to the position shown in FIG. 6 under the action of the spring 33. With the pump 18 cut off, the oil level in the engine tank 15 remains the same. The portion 39 of the air duct 22 is moved to cut off the air duct 22, which prevents oil from entering it through the venturi 34. When the shut-off valve 21 reopens, the pressure in the air duct 22 which is now continuous again will purge any oil that may have entered it back into the supply duct 17.

Other modes of controlling the shut-off valve 21 are possible. Other height positions of the nominal fill level $H_3$ and overfill level $H_1$ with respect to the optimum fill level $H_2$ can also be provided. Finally, various alternatives of the control and monitoring means are possible and some of them will be described below.

Figure 11:
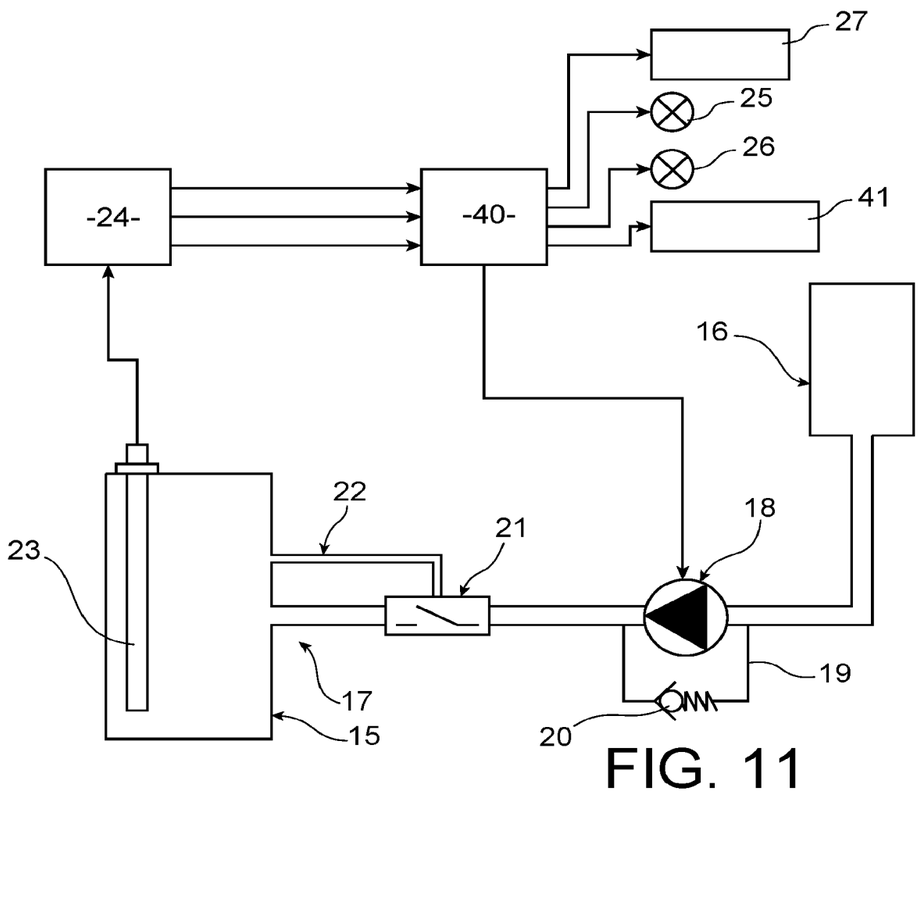
FIG. 11 illustrates a second embodiment of the invention.

FIG. 11 is thus referred to. The device shown in FIG. 5 is completed by an electronic filling control module 40, which receives the output signals from the processing electronics 24, emits a control signal for the pump 18 and the signals transmitted to the indicators 25 and 26, to the display 27 and to a breakdown display 41.

In the design of FIG. 5, the processing electronics 24 only allowed the operation of the pump 18 to be cut off, while information necessary for the filling control, such as the number of filling pulses to be given, was indicated to an operator by the display 27. In order to avoid the risk of inattention leading, for example, to insufficient pulses being given by the operator, the filling control electronics 40 itself gives indications of the number of pulses, or more generally the volume of oil to be delivered to the engine tank 15, to the pump 18. The filling method may otherwise be the same as before, including the same amount of oil to be delivered, associated with, for example, the difference in level (MOL+ 4ε). The breakdown or failure diagnostics will also be the same as in the previous embodiment. However, the breakdown display 41 will be able to indicate the existence of a breakdown or failure, possibly its nature if it can be identified, also indicate that the actual fill level of the engine tank 15 is unknown, and suggest actions to be taken.

The advantage of this embodiment is therefore that filling may be fully automated, after it has been initiated by the operator by means of a single control operation. However, it may be possible to inhibit the operation of the filling control electronics 40, if for example an incomplete filling of the engine tank 15 is desired for some reason. A manual filling control device of a known kind, but normally inactive in this embodiment, would then be added for use only in such exceptional situations.

Figure 12:
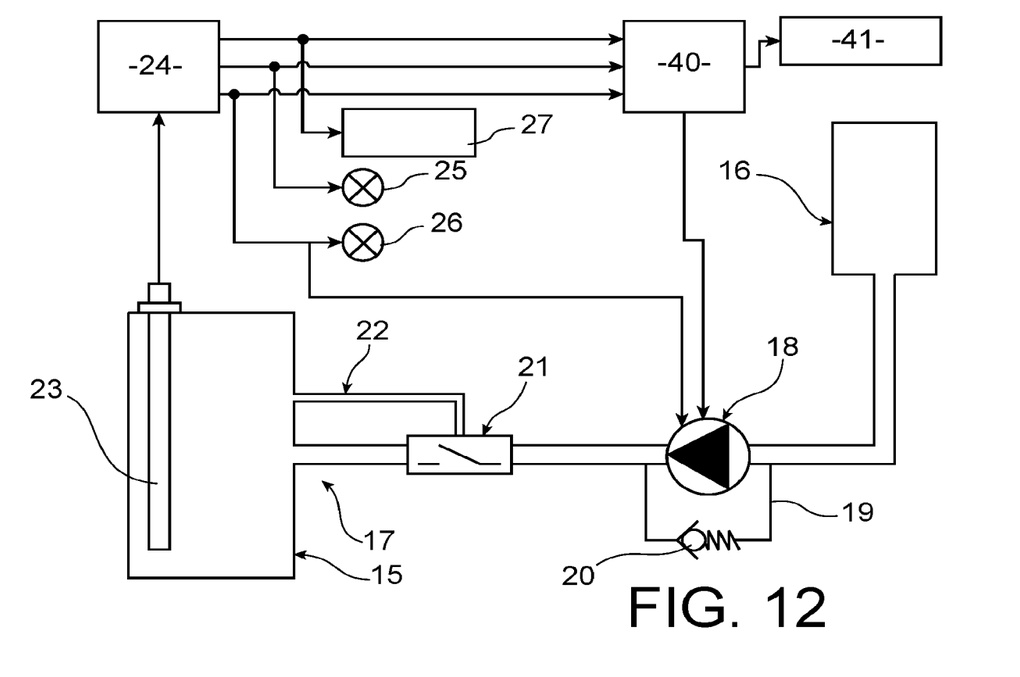
FIG. 12 illustrates an alternative to this second embodiment.

FIG. 12 illustrates an alternative embodiment, in which the processing module 24 remains responsible for turning on the indicators 25 and 26 and the display 27, with the control electronics 40 governing only the pump 18 and the breakdown display 41.

Figure 13:
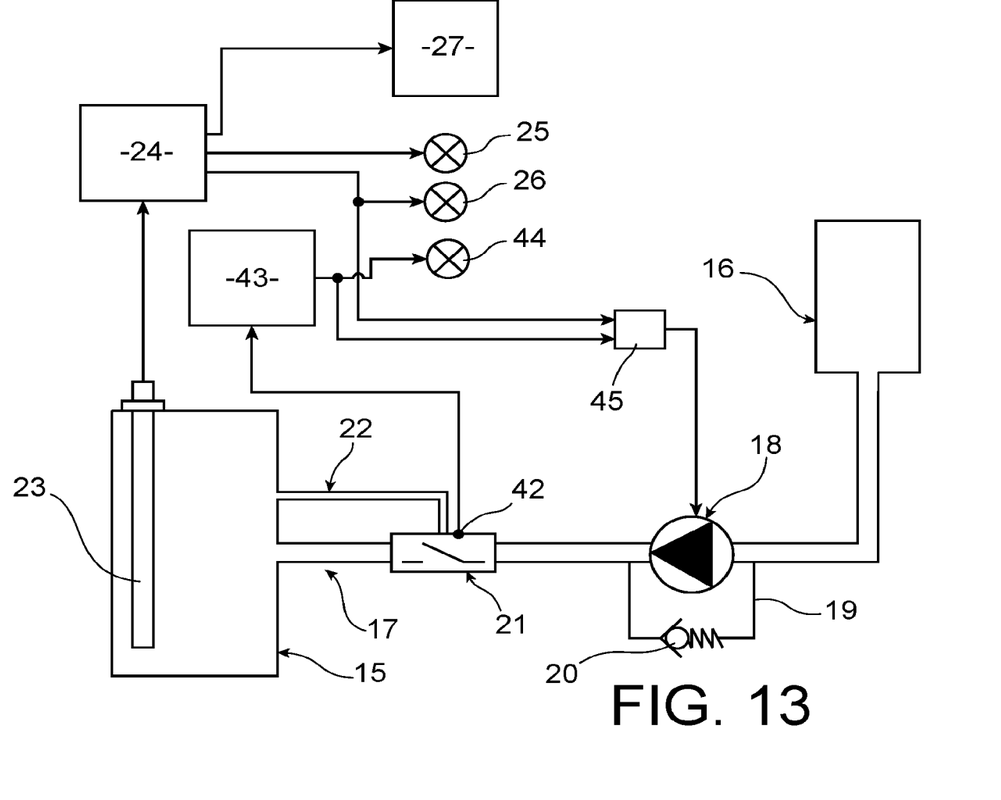
FIG. 13 illustrates a third embodiment of the invention.

A further embodiment is described by means of FIG. 13. It differs from the one shown in FIG. 5 in that a cut-off sensor 42 for the shut-off valve 21, a sensor processing electronics 43, and a mechanical cut-off indicator 44 are added. The latter is informed by the sensor processing electronics 43, which can also, concurrently with the processing electronics 24, control the cut-off of the pump 18 via an "OR" logic device 45 to shorten oil recirculation. The cut-off sensor 42 may be any device, electromagnetic or otherwise, capable of measuring or indicating the position of the spool 29 in the sleeve 28 and thus distinguishing between opening and closure of the shutdown valve 21.

Some breakdowns or failures were not well taken into account by the previous embodiments, in particular insufficient oil supply due to failure of the pump 18 or lack of oil in the aeroplane tank 7. This could then result in the worst case scenario in a stabilised oil level 37 between the nominal fill level $H_3$ and the optimum fill level $H_2$, thus in reality the aeroplane tank 15 incompletely filled, but with the fill light 25 alone turned on (due to the accuracy±ε of the probe), which would thus mean, with the previous embodiments, that filling has been successfully completed. If, in addition, the probe 23 were faulty and overestimated the oil level, the oil level could in fact be below the nominal fill level $H_3$.

As the shut-off valve 21 only closes when the oil level has reached the outlet 38 of the air duct 22, the indication of the closure of the shut-off valve 21, provided by the cut-off sensor 42, confirms that the engine tank 15 has been properly filled, provided that the shut-off valve 21 is operating suitably, which can be checked as previously, if the nominal fill indicator 25 only is turned on at the end of the filling method. A contrary indication that the shut-off valve 21 remains open at the end of filling would indicate a failure thereof or of the probe 23.

The indication that the spool 29 is switched from open to closed state by the cut-off sensor 42 also enables the pump 18 to be immediately shut off regardless of how much filling time was still planned. More generally, the mechanical cut-off sensor 42 allows for more numerous and more reliable breakdown or failure detections, possibly with redundancies with means already described.

The invention claimed is:

1. An oil tank filling device for filling an oil tank of an aircraft engine, comprising:
    a supply duct leading to the oil tank of the aircraft engine and supplied with oil by another tank disposed in an aircraft at a distance from the aircraft engine,
    a pump placed on the supply duct, and
    a filling processing module, connected to a probe of an oil level in the oil tank and giving height indications of said oil level,
    wherein the supply duct comprises a filling shut-off valve located between the pump and the oil tank, the oil tank filling device comprises a device for closing the filling shut-off valve, independent of the probe and the filling processing module, sensitive to oil rising to an optimum fill level of the oil tank, and
    wherein the filling processing module comprises a tank overfill indicator and a tank nominal fill indicator, said tank overfill indicator and said tank nominal fill indicator being controlled when the oil reaches an overfill level above the optimum fill level and a nominal fill level below the optimum fill level, respectively, and the optimum fill level is distant from the nominal fill level and the overfill level by differences in level both corresponding to a measurement uncertainty ascribed to the probe.

2. The oil tank filling device according to claim 1, wherein the probe comprises a magnetic float and electrical switches arranged in tiers at different heights of the oil tank.

3. The oil tank filling device according to claim 1, wherein the filling processing module comprises a display for an amount of oil to be supplied to the oil tank, based on measurements of the probe.

4. The oil tank filling device according to claim 1, wherein the supply duct comprises a bypass around the pump equipped with a flap valve allowing only a reverse flow, towards the another tank, to a supply circulation produced by the pump.

5. The oil tank filling device according to claim 1, comprising a module for automatically controlling the pump based on indications from the filling processing module.

6. An aircraft, comprising at least one oil tank filling device according to claim 1, wherein the oil tank is an engine tank, and the supply duct originates from another oil tank present in a cabin of the aircraft.

7. The oil tank filling device according to claim 1, comprising a sensor detecting closures of the filling shut-off valve and an indicator of said closures detected by the sensor.

8. The oil tank filling device according to claim 7, comprising a sensor processing module, informed by the sensor to shut off the pump when closures of the filling shut-off valve have been detected.

9. The oil tank filling device according to claim 1, wherein the device for closing the filling shut-off valve comprises an air duct connecting to the oil tank via an outlet port which can be sealed with oil and, at an opposite end, connecting to an inlet with a pressure lower than a pressure in the oil tank, the air duct passing through a first control chamber of the filling shut-off valve, and the shut-off valve contains a shutter of the supply duct, moved by a pressure in the first control chamber between an opening position of the supply duct when the pressure in the first control chamber is exposed to the pressure in the oil tank and a closing position of the supply duct when the pressure in the first control chamber is exposed to only said lower pressure.

10. The oil tank filling device according to claim 9, wherein said opposite end of the air duct connects to a venturi portion of the supply duct located between the pump and the filling shut-off valve.

11. The oil tank filling device according to claim 9, wherein the air duct also passes through the shutter of the filling shut-off valve, and is cut off by the shutter when the filling shut-off valve is in the closing position.

12. The oil filling device according to claim 9, wherein the filling shut-off valve comprises a spring returning the shutter to the opening position.

13. The oil tank filling device according to claim 9, wherein the filling shut-off valve comprises a second control chamber, opposite to said first control chamber with respect to the shutter, and connected to the supply duct between the pump and the filling shut-off valve by a pressure inlet duct.

14. A method for filling an oil tank equipped with a filling device according to claim 1, the method comprising:
    determining an amount of oil to be delivered to the oil tank based on an initial oil level measurement given by the probe;
    delivering said amount; and
    checking with the tank overfill indicator and the tank nominal fill indicator whether the oil tank has been filled successfully.

15. The method for filling an oil tank according to claim 14, wherein said checking is made exclusively based on visual check means belonging to the filling device, said visual check means comprising said tank overfill indicator and said tank nominal fill indicator.

16. The method for filling oil according to claim 14, wherein the amount of oil to be delivered corresponds to an amount evaluated to reach with certainty the optimum fill level, and comprising an amount theoretically necessary to reach said optimum fill level from the initial oil level measurement, increased by a fixed amount being a function of a measurement uncertainty ascribed to the pump.

17. The method for filling an oil tank according to claim 16, wherein the amount of oil to be delivered corresponds to an amount evaluated to reach with certainty the overfill level.

18. The method for filling an oil tank according to claim 16, further comprising automatically shutting off the pump when either the filling shut-off valve is detected as closed or the overfill level is reached.

19. The method for filling oil according to claim 16, wherein the fixed amount corresponds to a volume corresponding to a difference in level of twice the measurement uncertainty ascribed to the probe.

20. The method for filling oil according to claim 19, wherein the fixed amount corresponds to four times the measurement uncertainty ascribed to the probe.

\* \* \* \* \*